United States Patent [19]

Miller

[11] Patent Number: 5,218,781
[45] Date of Patent: Jun. 15, 1993

[54] COLLAPSIBLE KING CRAB POT WITH ONE-PIECE NET

[76] Inventor: George R. Miller, 1 Jackson Pl., Durango, Colo. 81301

[21] Appl. No.: 874,737

[22] Filed: Apr. 27, 1992

[51] Int. Cl.⁵ ............................................. A01K 69/00
[52] U.S. Cl. ...................................... 43/100; 43/105; 43/7
[58] Field of Search ................. 43/100, 102, 103, 104, 43/105, 7, 9.4, 9.5, 9.95

[56] References Cited

U.S. PATENT DOCUMENTS

| | | |
|---|---|---|
| 354,846 | 12/1886 | Walker . |
| 639,628 | 12/1899 | Thomsen et al. . |
| 690,507 | 1/1902 | Zangenberg . |
| 699,084 | 4/1905 | Dill . |
| 786,055 | 3/1905 | Rudiger . |
| 860,506 | 7/1907 | Williams . |
| 878,820 | 2/1908 | Murdoch . |
| 905,263 | 12/1908 | Wing . |
| 1,079,576 | 11/1913 | Noyes . |
| 1,171,924 | 2/1916 | Brown . |
| 1,407,744 | 2/1922 | Ftyklo . |
| 1,425,587 | 8/1922 | Hammond et al. . |
| 1,445,763 | 2/1923 | Gibbs et al. . |
| 1,474,087 | 11/1923 | Prime . |
| 1,927,599 | 9/1933 | Smith . |
| 1,958,724 | 5/1934 | Stanislaw . |
| 1,985,177 | 12/1934 | Lawrence . |
| 2,119,828 | 6/1938 | Nordenstam . |
| 2,516,658 | 7/1950 | Stelly . |
| 2,530,449 | 11/1950 | Bush . |
| 2,552,007 | 5/1951 | Griffith . |
| 2,716,304 | 8/1955 | Taylor . |
| 2,731,761 | 1/1956 | Marshall ................. 43/100 |
| 2,760,297 | 8/1956 | Buyken . |
| 2,769,274 | 11/1956 | Ougland . |
| 2,910,801 | 11/1959 | Safarik et al. . |
| 3,069,803 | 12/1962 | Leakey . |
| 3,184,881 | 5/1965 | Jatzeck . |
| 3,191,338 | 6/1965 | Burgess et al. . |
| 3,209,484 | 10/1965 | Beamer .................. 43/100 |
| 3,271,894 | 9/1966 | Manno et al. . |
| 3,319,373 | 5/1967 | Gale et al. . |
| 3,337,982 | 8/1967 | Sajulan .................. 43/100 |
| 3,373,523 | 3/1968 | Olafson .................. 43/100 |

(List continued on next page.)

FOREIGN PATENT DOCUMENTS 553021 5/1923 France .................. 43/100

Primary Examiner—Richard K. Seidel
Assistant Examiner—Chuck Y. Mah
Attorney, Agent, or Firm—Kenton L. Freudenberg; Maxwell C. Freudenberg

[57] ABSTRACT

A collapsible crab pot structure comprising a crap pot frame with a removable unitary bag-like net therein secured to the frame by a rope framework within the bag-like net. The bag-like net can be made from a single piece of netting fabric according to a prescribed pattern. The frame has square parallel vertically-spaced similarly oriented congruent relatively-movable rigid top and bottom horizontally extending frame portions. The four respective corners of the top and bottom frame portions are interconnected by, and pivotably connected to, four post structures to form an essentially parallelpiped frame structure. A netting-covered door in a vertical front side of the frame structure is hinged along the front side of the top frame portion for swinging movement from a closed vertical position to a position atop the top frame portion. Convergent tunnel portions of the trap net enter the trap from opposite vertical sides which are perpendicular to the door side of the frame structure. The pivoting connections between the top and bottom frame portions and the vertical posts restrict collapsing movement to a swinging translational motion of the top frame portion relative to the bottom frame portion in the direction rearwardly away from the door side., Each vertical post swings rearwardly through an angle of 90 degrees. Removable railway rail sections are secured within the frame structure to provide extra weight for ballast.

29 Claims, 9 Drawing Sheets

U.S. PATENT DOCUMENTS

| | | | |
|---|---|---|---|
| 3,678,612 | 7/1972 | Hendrickson . | |
| 3,691,667 | 9/1972 | Illinger | 43/100 |
| 3,786,593 | 1/1974 | Gerbrandt . | |
| 3,795,073 | 3/1974 | Olsen . | |
| 3,821,861 | 7/1974 | Jalbert . | |
| 3,906,654 | 9/1975 | Leslie | 43/100 |
| 4,075,779 | 2/1978 | Olafson . | |
| 4,156,984 | 6/1979 | Kinser . | |
| 4,184,283 | 1/1980 | Wyman . | |
| 4,221,071 | 9/1980 | Sjolund | 43/102 |
| 4,354,325 | 10/1982 | Aho . | |
| 4,429,659 | 2/1984 | Holyoak . | |
| 4,437,295 | 3/1984 | Holyoak . | |
| 4,486,259 | 12/1984 | Faucillon . | |
| 4,538,376 | 9/1985 | Morton . | |
| 4,565,027 | 1/1986 | Sato . | |
| 4,604,823 | 8/1986 | Ponzo . | |
| 4,654,997 | 4/1987 | Ponzo | 43/102 |
| 4,706,409 | 11/1987 | Downing . | |
| 4,730,411 | 3/1988 | Katis . | |
| 4,843,756 | 7/1989 | Wyman et al. . | |
| 4,848,025 | 7/1989 | Wyman et al. . | |
| 4,864,770 | 9/1989 | Serio . | |
| 4,905,405 | 3/1990 | Hendricks . | |
| 4,982,525 | 1/1991 | Miller . | |

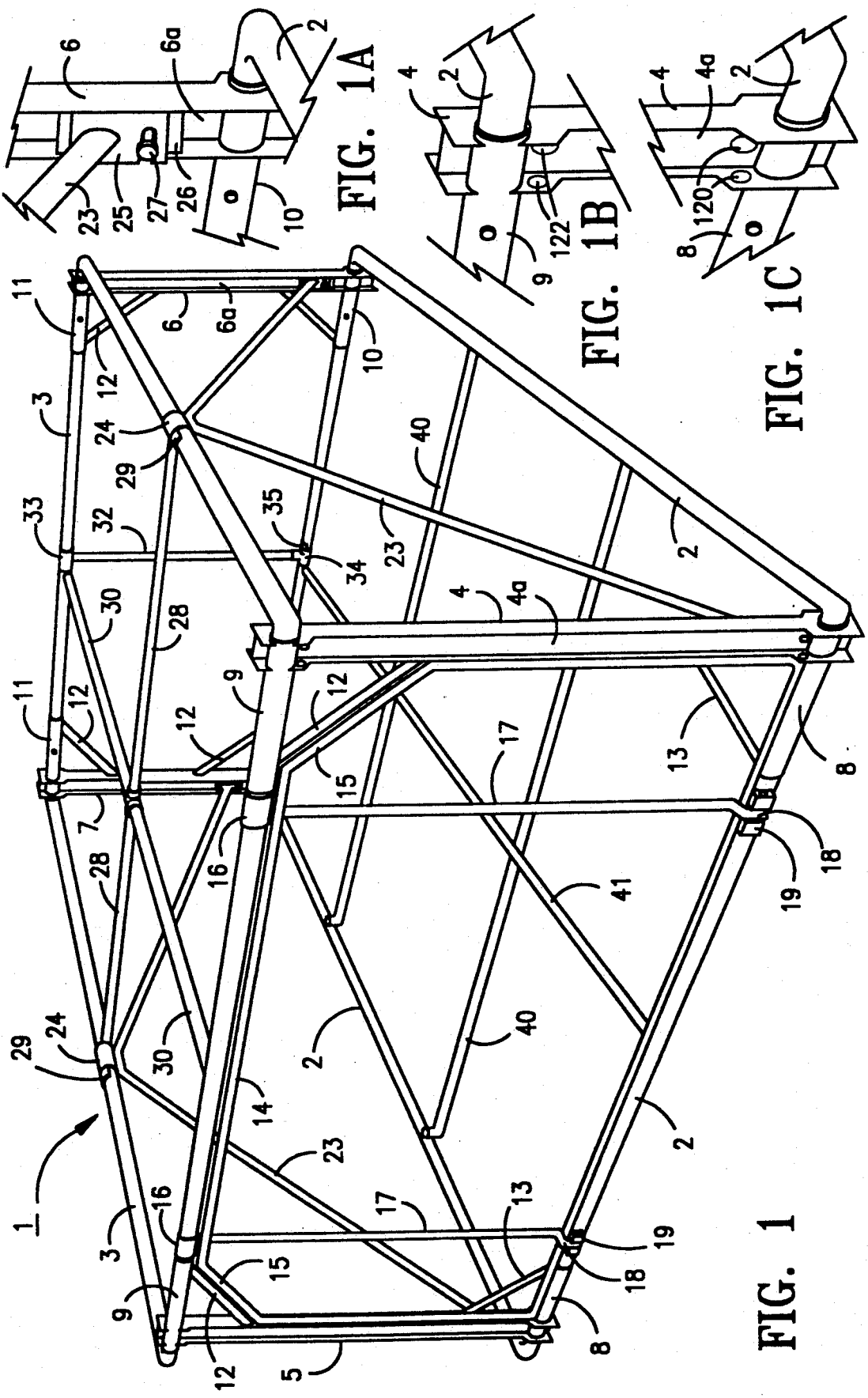

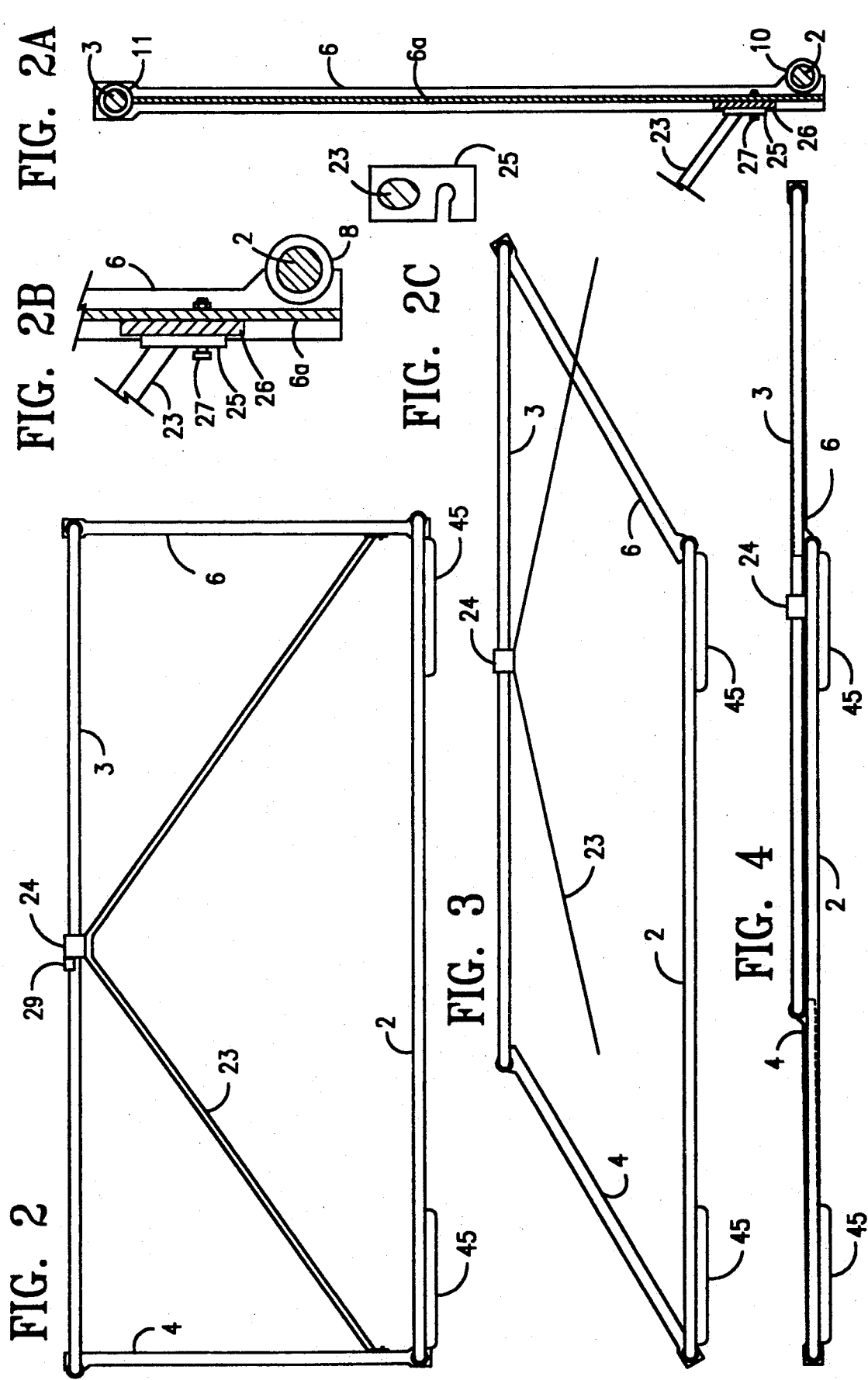

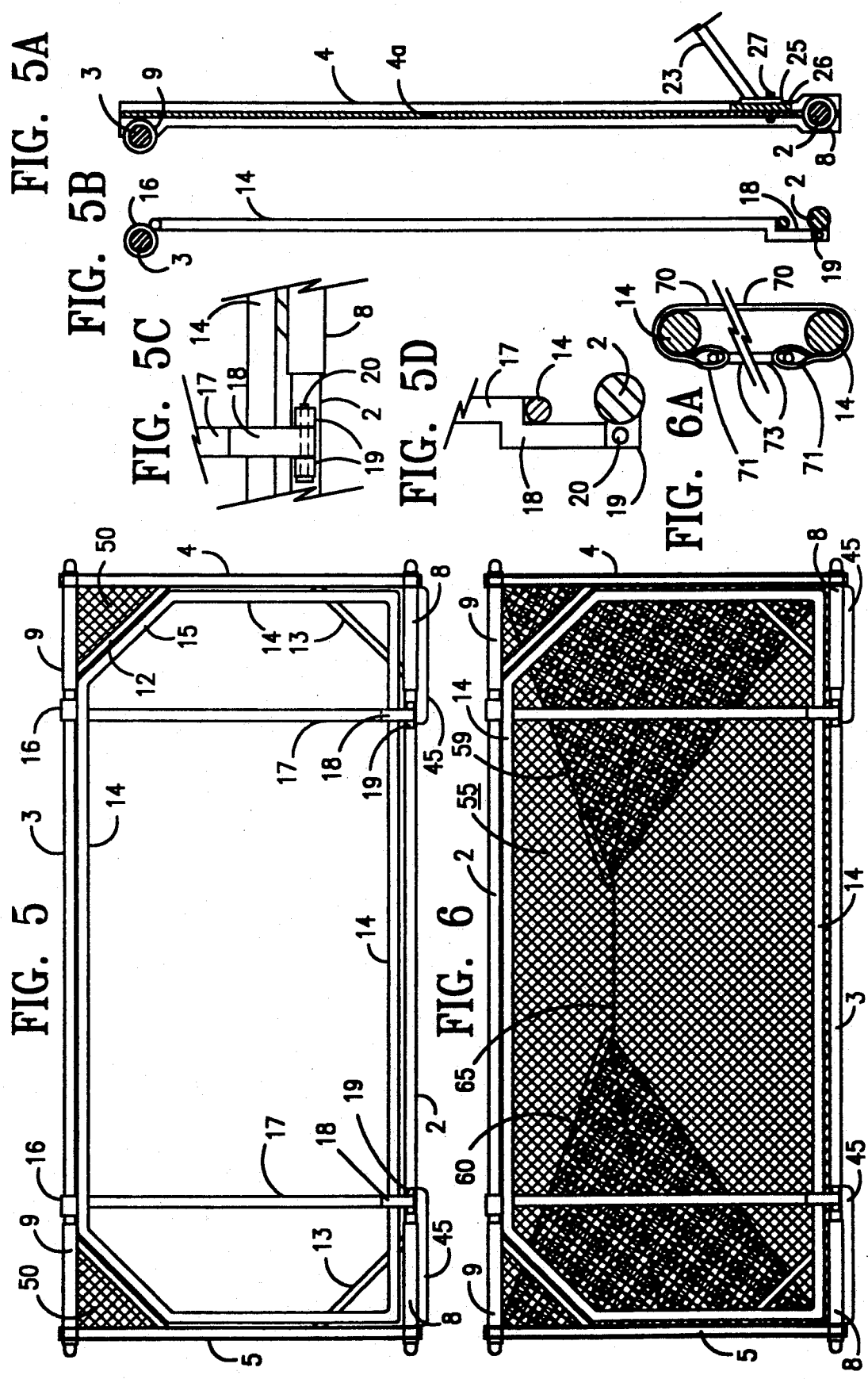

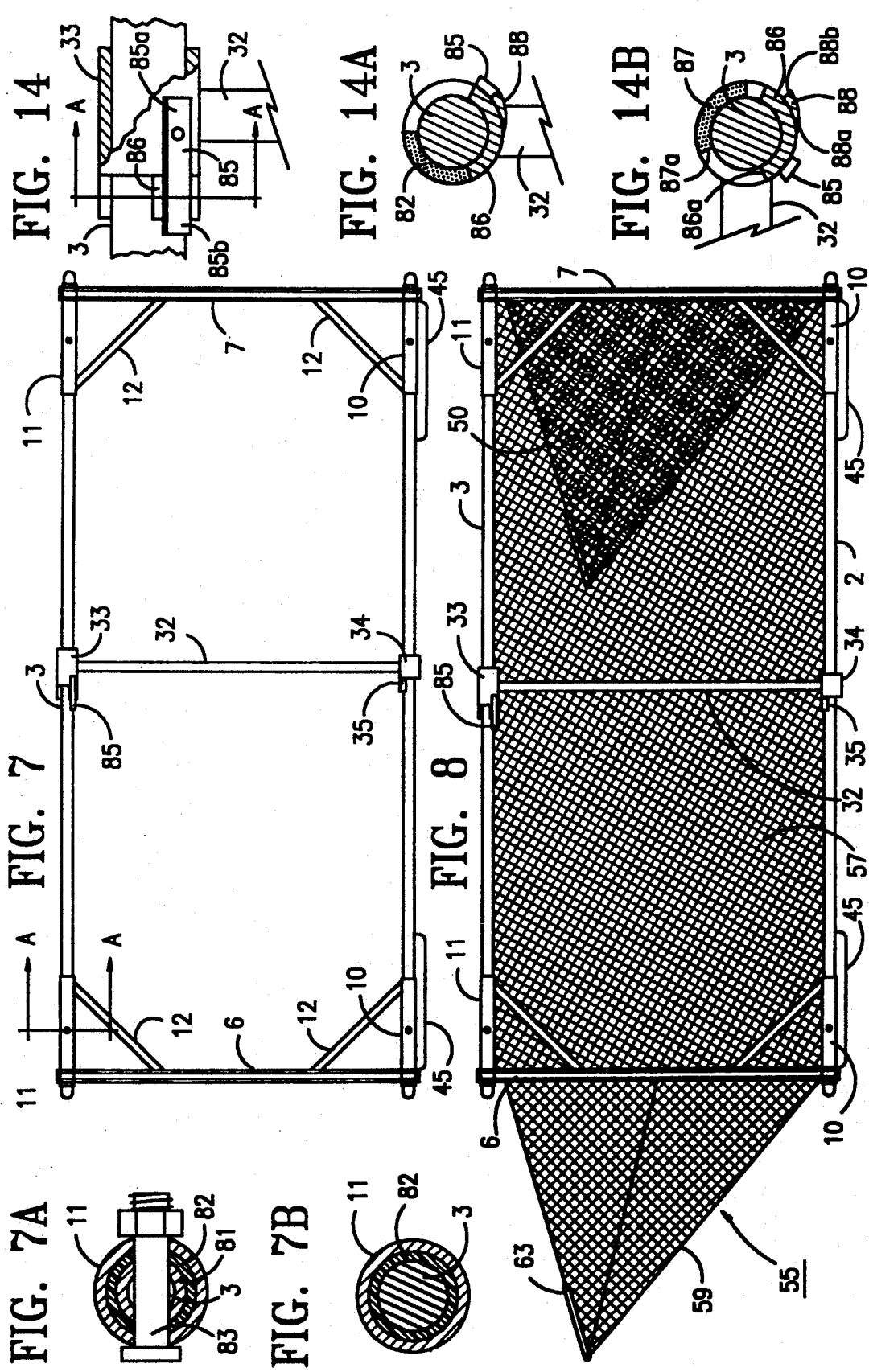

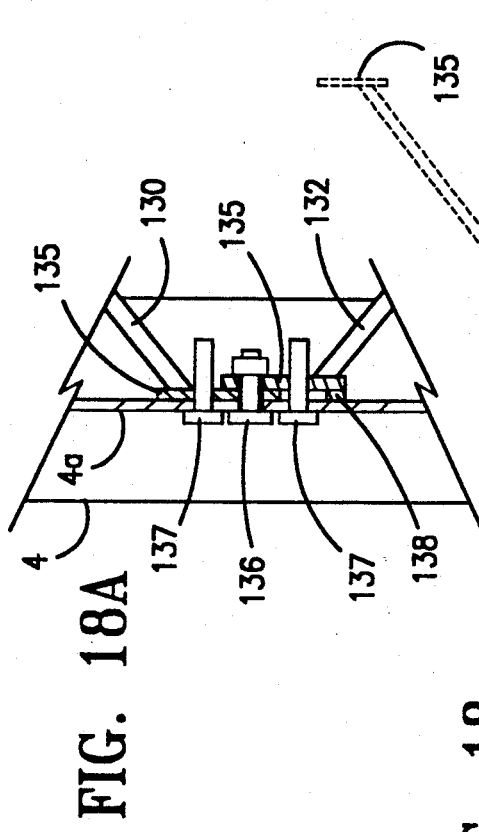
FIG. 18A
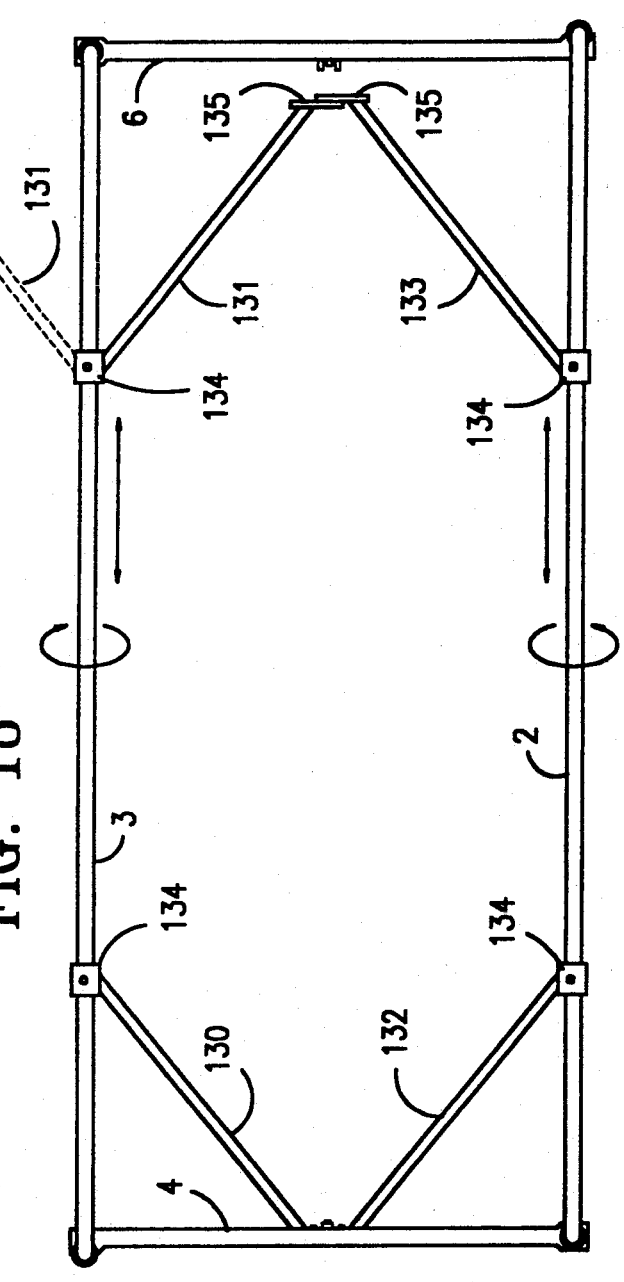
FIG. 18
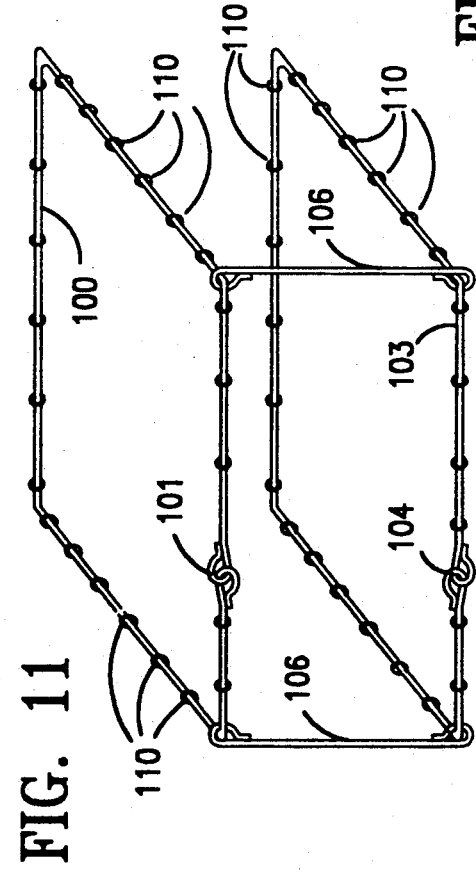
FIG. 11
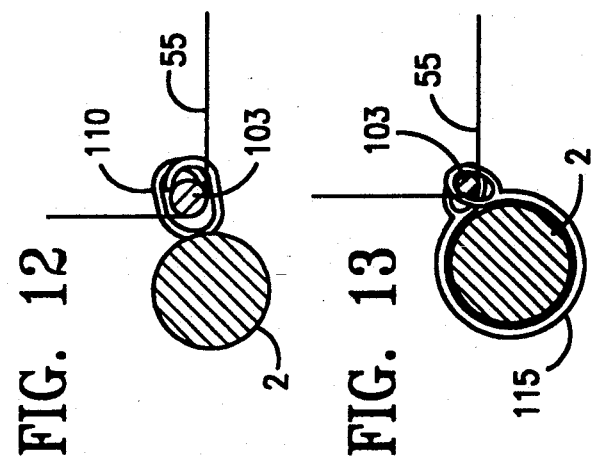
FIG. 12
FIG. 13

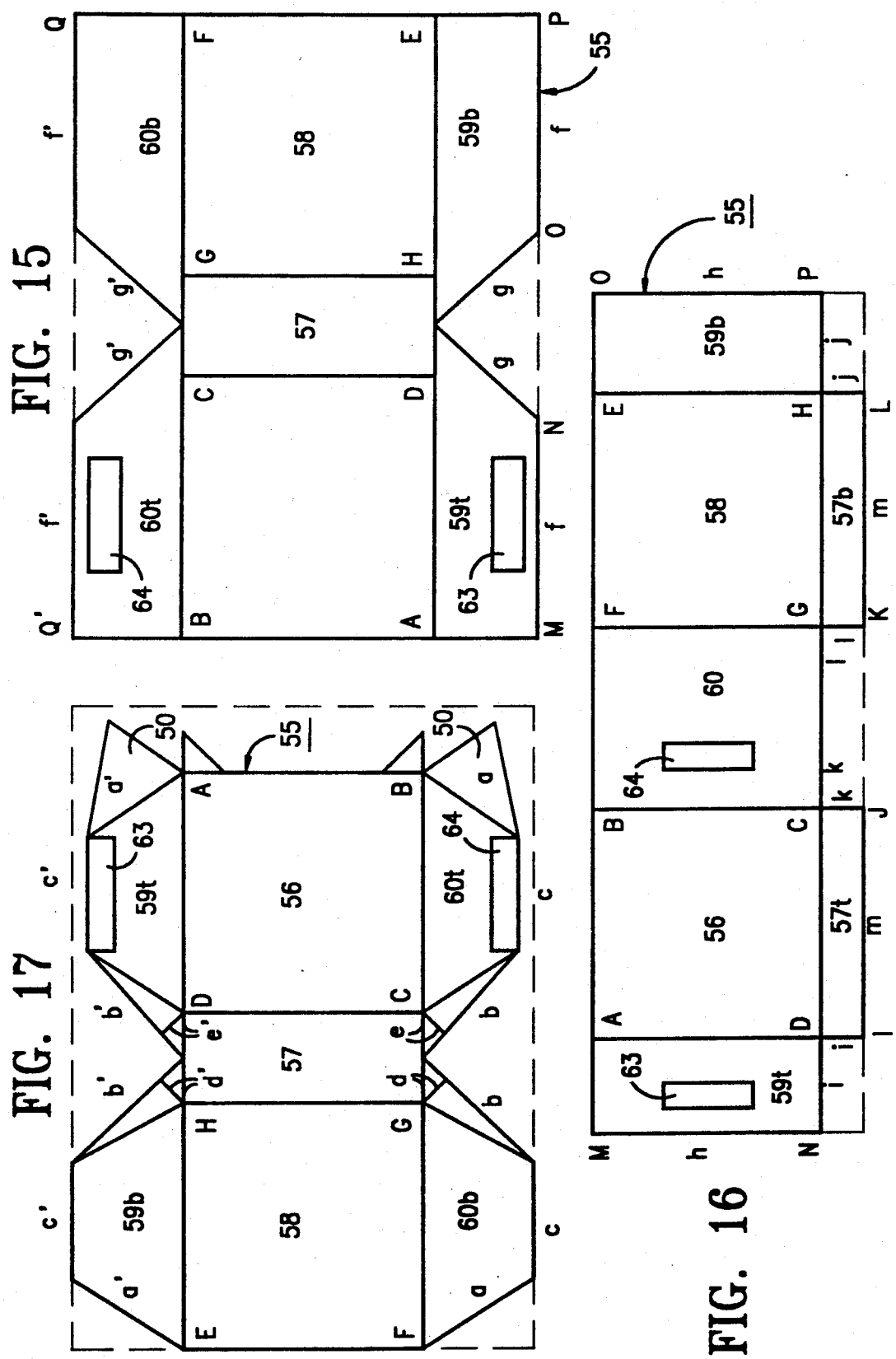

COLLAPSIBLE KING CRAB POT WITH ONE-PIECE NET

This invention relates to a collapsible frame for a crab pot or trap structure having an easily replaceable unitary or one-piece netting structure secured therein and with removable elongated weighting members within the netting and anchored to the trap frame.

BACKGROUND OF THE INVENTION

King crab pots currently in use weigh about 650 to 700 pounds and have a rigid outer main frame made of 1¼ to 1½ inch mild steel bars. The weight is required to hold these pots in place on the sea floor in certain fishing conditions. The outer frame forms a rectangular box, the top and bottom of which are approximately seven feet square, and each side of which is approximately a three by seven foot rectangle. Inside the outer frame is welded a rigid frame of lighter steel bars to which a netting system is lashed. Tunnels which are used by crabs and fish for entrance into the pots are attached to two opposing sides. The pots are lifted by a rope or cable attached to a side perpendicular to the tunnel openings. A door is placed opposite the lifting side so that the catch may be removed from the pot. The rigid inner frame requires numerous pieces of netting to be cut and lashed to form the sides, tunnels and door covering of the trap. Although others have recognized that a collapsible pot would have some advantage, no collapsible pot previously devised has proven durable enough to be used in commercial fisheries in the North Pacific Ocean.

SUMMARY AND OBJECTS OF THE INVENTION

Among the objects of the present invention is to enable manufacture of a collapsible pot for use in the King Crab, Tanner Crab, Opelio Crab and Pot Cod fisheries which achieves the following objects or characteristics.

The pot must be durable enough to be fished in winter seas in the Bering Sea over an extended period and be able to withstand salt water corrosion, sub-zero temperatures and be suitable for use in strong tidal and other current flows. It must be compatible with on-deck equipment, particularly King Crab pot haulers and pot launchers currently in use.

An object of this invention is to provide a collapsible crab pot frame having relatively movable parts for collapsing and which is simple to manufacture, a strong durable structure, and damage resistant in an undersea environment during heavy seas and in the presence of strong tidal and other current conditions, and which can withstand the likely impacts of substantial force due to contacts with the fishing vessel or other objects while a fully loaded pot is being lifted from the water in heavy seas.

Another object of the present invention is to provide a collapsible crab pot structure which is extremely compact when collapsed and which does not require disassembly and separation of the parts of the crab pot frame in order to permit its manipulation to a collapsed configuration.

A further object of the invention is to provide a low cost, easy to manufacture, serviceable and readily replaceable unitary bag-like net for a crab pot.

Another object of the invention is to provide a readily attachable or removable net for a crab pot which can be secured to a crab pot frame with minimal tying of the net to the frame structure.

Another object of the invention is to provide a collapsible crab pot having an automatic manually releasable safety latching mechanism to latch the pot frame in its erect configuration during release or securement of the primary bracing structure which securely anchors the relatively movable parts to each other in their erect operating configuration.

A further object of the invention is to provide an improved collapsible crab pot which can be stacked in interlocking relationship with other such pots, such stacking being possible for multiple erect pots or for multiple collapsed pots.

Another object of the invention is to provide a collapsible crab pot structure which has a very compact collapsed configuration and which can be quickly and completely collapsed and stacked with the netting attached.

Another object of the invention is to provide ballast weights for a crab pot which are low cost, durable, easily removed or attached, and which are conveniently handled for storage in the hold of a vessel for improved vessel stability during travel of the vessel in heavy seas.

Another object of the invention is to provide an improved extra weight container device for a crab pot which can be transported empty, and which can make use of gravel or other aggregate obtained near a fishing site, to avoid the need for transporting most of the extra weight of the device over long distances on a fishing or transport vessel.

Pots in accordance with the present invention may be quickly and safely collapsed and stacked at sea, for transportation to and from the fishing grounds. Since a substantially larger number of collapsed pots may be safely transported per trip, time and fuel savings can be realized with their use in this very competitive industry.

A substantial portion of the weight required to keep the pot positioned on the sea bottom in strong tides and heavy seas can be readily detached from the pots and placed below deck during transport to increase the stability and pot carrying capacity of the fishing vessel. Also the pots may be easily adapted for fishing conditions which do not require substantial weight, such as lining a string of pots in deep water or cod pot fishing in relatively sheltered conditions.

The netting is made stronger and will have a coating to protect it against ultraviolet radiation to help extend the useful netting life and save replacement cost. The suspension system will also provide flexibility to allow collapse of the pots with netting attached. Separate door netting will permit selection of a mesh size to permit under-limit crabs to escape and may be easily changed to accommodate the size of crab being fished, due to a simplified system of securing the netting to the door.

The use of empty containers for extra trap weights to be transported empty and filled with gravel or other aggregate near the fishing grounds will save substantial shipping cost.

DESCRIPTION OF THE DRAWINGS

FIG. 1 is a perspective from the upper right front of a collapsible crab pot frame structure in its erect position.

FIG. 1A is an enlarged perspective of the lower right rear corner of the frame of FIG. 1.

FIG. 1B is an enlarged perspective of the upper right front corner of the frame of FIG. 1.

FIG. 1C is an enlarged perspective of the lower right front corner of the frame of FIG. 1.

FIG. 2 is a right side view of the frame of FIG. 1 in its erect position and showing one of two swinging inverted V-shaped brace members used to anchor the horizontal main frame members to the vertical corner posts of the frame at opposite sides of the frame.

FIG. 2A is an enlarged vertical section through the right vertical post shown in FIG. 2.

FIG. 2B is a further enlarged vertical section of the structure at the lower end of FIG. 2A.

FIG. 2C is a left side view of a partial arm and foot structure shown in FIG. 2B.

FIG. 3 is a right side view of the frame of FIG. 1 in a partially collapsed position.

FIG. 4 is a right side view of the frame of FIG. 1 in its completely collapsed position.

FIG. 5 is a front view of the trap structure of FIG. 1 before mounting the structure of a netting bag therein.

FIG. 5A is an enlarged vertical section similar to FIG. 2A, but showing a post at the right front of FIG. 1 and at the right in FIG. 5.

FIG. 5B is an enlarged vertical transverse section through the door of the trap of FIGS. 1 and 5 through the right side door hinge at the top of the door.

FIG. 5C is an enlarged front view of the lower end of FIG. 5B showing details of a door latching structure.

FIG. 5D is an enlarged view of the lower end of FIG. 5B showing details of a door latching structure.

FIG. 6 is a front view like FIG. 5 with the addition of the netting bag structure secured therein without netting on the door of the trap.

FIG. 6A is a vertical transverse section through the door of the trap with central portions of the door cut away to show how a netting is secured to the door frame.

FIG. 7 is a rear view of the trap frame of FIG. 1.

FIG. 7A is a section through a tubular hinge on the trap frame taken on line A—A of FIG. 7 showing details of a shear-resistant bolt structure to assist in holding the frame erect.

FIG. 7B is a section corresponding to FIG. 7A of a structure when no shear-resistant bolt arrangement is used in the hinge mechanism to help keep the trap erect.

FIG. 8 is a rear view of the trap frame of FIG. 1 similar to FIG. 7, but with the trap netting partially in place, one of the netting tunnels being shown in its position before being pushed within the frame for a tensioning connection to the opposite tunnel.

FIG. 11 is a perspective view representing rope structures used to secure netting within the trap frame.

FIG. 12 is a section through the lower main frame bar of the trap illustrating a metal hook member welded to the frame bar as one method of securing the netting to the frame at one point therealong.

FIG. 13 is a view similar to FIG. 12 illustrating another method for securing the netting to the frame by a plastic covered cable with looped ends through which the netting supporting rope is passed.

FIG. 14 is an enlarged rear view at the top rear center of the trap and partially in section, showing details of an automatic frame latching safety arrangement which temporarily holds the trap erect after initial erection until stronger bracing structures are secured between the relatively movable parts of the trap frame.

FIGS. 14A and 14B are sections on line A—A of FIG. 14 and showing relatively movable parts of the frame latching safety arrangement in erect and collapsed positions of the frame, respectively.

FIGS. 15, 16 and 17 are patterns as laid out flat for netting to be cut from netting fabric or otherwise woven, stitched, knotted or manufactured for assembly into unitary bag-like netting structure to be secured in trap frames as shown in FIG. 1 or in other frames having a generally similar rectangular configuration. FIG. 16 is preferred.

FIG. 18 is a side view similar to FIG. 2 of an alternative embodiment of the invention showing four individual swinging and sliding brace members used to anchor the horizontal main frame members to the vertical corner posts of the frame at one side of the frame.

FIG. 18A is enlarged section showing details of the attachment of the swinging and sliding brace members at the left of FIG. 18, to the vertical corner post at the left in FIG. 18.

DESCRIPTION OF THE PREFERRED EMBODIMENT

Figure 9:
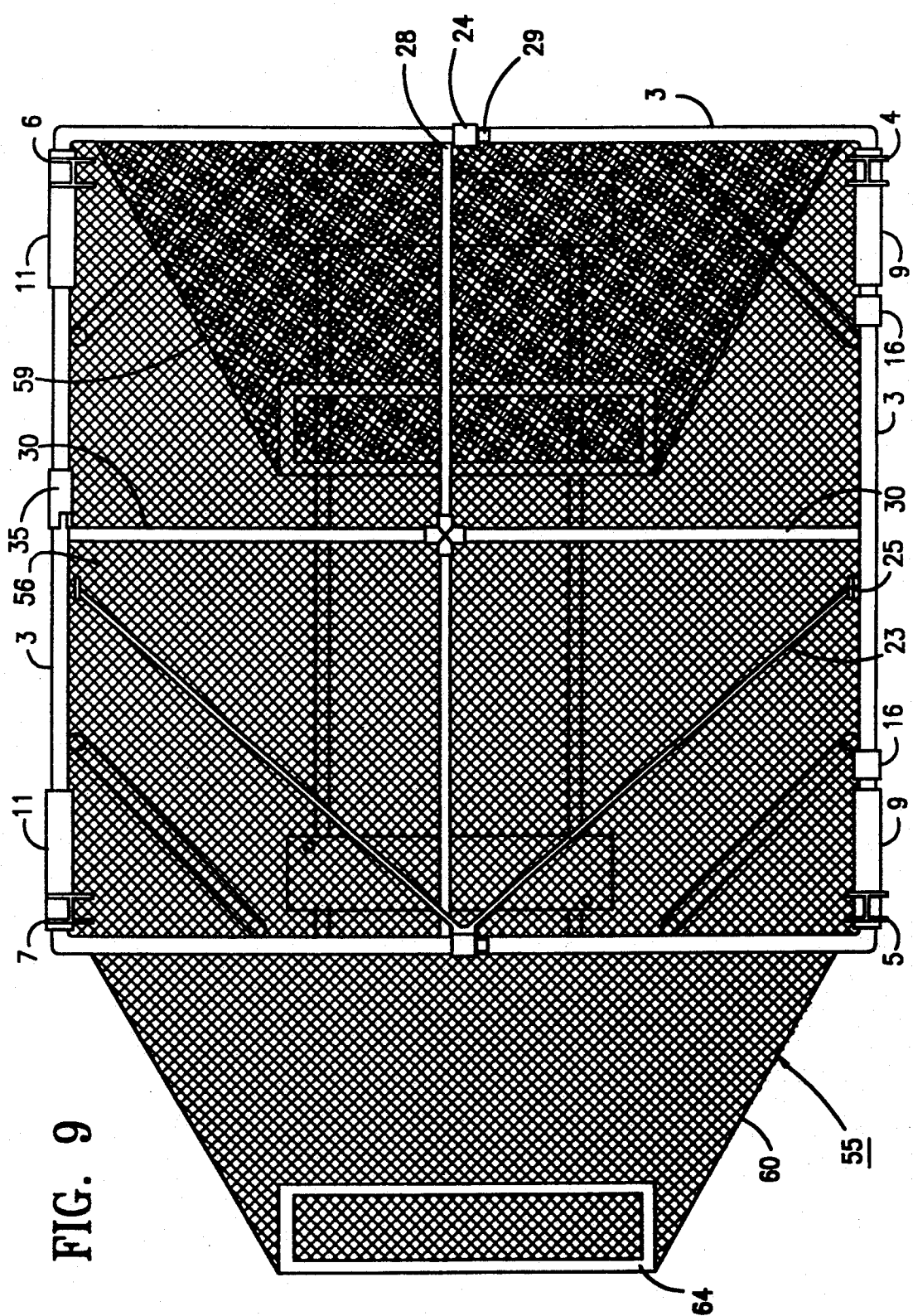
FIG. 9 is a top view of the trap with the trap netting partially in place, one of the netting tunnels being shown in its position before being pushed within the frame for a tensioning connection to the opposite tunnel and showing an anti-collapsing inverted V-shaped brace member swung to a position atop the left side of the trap where it is positioned when the trap is collapsed.

FIG. 1 is a perspective view from the right front corner of a crab pot or trap frame structure 1 in accordance with the preferred embodiment of the invention and within which will be mounted netting structure and weighting structures in accordance with other features of the preferred embodiment of the invention.

The frame structure 1 of FIG. 1 comprises a generally square horizontally extending base frame structure 2 formed by one or more heavy steel bars bent to the square configuration with ends of the bar or bars welded together. However, before welding the bar ends together, several tubular structures described hereinafter as rotatably supported on the frame 2 are appropriately positioned on the bar. The top of the trap frame structure 1 comprises a second similarly generally square horizontally extending top frame structure 3 with rotatable tubular structures thereon and similarly formed from a heavy steel bar. The square frame 3 is approximately the same size as the square frame 2 and is parallel thereto essentially directly thereabove in the erect position of the trap shown in FIG. 1.

The horizontal and parallel base frame loop 2 and top frame loop 3 are interconnected at the front corners of the trap frame structure by means of vertically extending front corner post structures comprising the posts 4 and 5 and by similar vertically extending corner post structures at the rear which comprise the rear posts 6 and 7. These corner posts 4-7 are I-beam members. The corner posts 4 and 5 at the front or door side of the trap are connected at their lower ends to steel tubes 8 extending inwardly at the doorway and rotatably mounted on the frame bar 2. Similar tubes 9 extend inwardly from the upper ends of the posts 4 and 5 are also rotatably mounted on the top fame bar 3.

At the rear of the trap 1, the corner posts 6 and 7 are similarly pivotably mounted at their lower and upper ends by tubes 10 and 11, respectively. The upper front tubes 9 on the front side of bar 3 and the upper rear tubes 11 on the rear side of top bar 2 have their innermost ends connected to the posts by means of downwardly and outwardly oriented corner braces 12. The innermost ends of lower rear tubes 10 also are connected to posts 6 and 7 by similar upwardly and outwardly oriented corner braces 12. Similar corner braces 13 connect the lower front tubes 8 to their respective corner posts 4 and 5, but these braces 13 are rearwardly offset behind the lower corners of a door structure 14 at the front of the trap frame structure 1.

The door structure 14, shown in FIGS. 1, 5 and 6, is generally rectangular and formed from a steel bar having horizontal top and bottom portions and vertical side portions. However, the top portion is connected to the side portions by diagonally extending corner portions 15 extending just below and parallel to the front corner braces 12 which are at an angle of about 45 degrees from the vertical. The door structure 14 is hinged for vertical swinging movement out, up and around the front side of the frame 3 by means of door hinge steel tubes 16 rotatably mounted on the bar 3. These tubes 16 are adjacent the innermost ends of the tubes 9. The door structure has two vertical crossbars 17 extending downwardly from near the hinge tubes 16 to the lower horizontal portion of the door perimeter with a short extension 18 of each crossbar 17 extending outward over this lower horizontal portion and therebelow to a position between a pair of lugs or latching brackets 19 secured to the front of the bar 2. In the closed position of the door the extension 18 and the lugs 19 have aligned horizontal apertures through which a detent-retained removable latching pin 20 is inserted as a means to latch the door structure 14 closed.

The hinging connections between the frames 2 and 3 and the tubes 8-11 at the upper and lower ends of the corner post structures enable the top frame 2 to be moved with a translatory motion rearwardly and downwardly from the position shown in FIGS. 1 and 2, through the intermediate position shown in FIG. 3, to a completely collapsed position shown in FIG. 4, where the top bar 3 rests atop a portion of the lower bar 2. The height of the flanges of the I-beam corner posts 4-7 have been narrowed to the diameter of the main frame bars 2 and 3 over most of their lengths to allow the I-beams to fold down, when the pot is collapsed to the position of FIG. 4, to be within and coplanar with the frames 2 or 3 except at their ends.

To support the upper frame 2 in the erect position against such translatory motion, the sides of the top frame 2 are each provided with a downwardly depending inverted V-shaped anti-collapsing braces 23 connected at its apex to a central point of the side of frame 3 and at the lower ends of its arms to the front and rear corner posts at each respective tunnel side of the trap structure 1. Each of the braces 23 is pivotably supported at its apex on a respective side portion of the frame 3 by means of a tube 24 which is rotatable on the frame 3.

The lower ends of the arms of the braces 23 each have a flat slotted foot member 25 mounted thereon as seen in the details of FIGS. 1A, 2A, 2B and 2C. These feet 25 are flat plates generally parallel to the web portions of the corner posts to which they will be secured. The sides of the slot, which opens toward the inside of the trap in each foot, straddle a bolt projecting from the web portion of the corner post and allow the foot 25 to swing to and from a position where the edges of the foot are aligned between the flanges of the I-beam post and wherein the outer face of the foot 25 can be clamped against a small flat spacing platform 26 secured to the web as seen in FIGS. 2A and 2B. The foot is clamped by means of a bolt 27 passing through the platform 26 and the web and threaded into a nut anchored to the opposite side of the web. When so clamped, the clamping force of the bolt 27 and the position of the flanges of the I-beam astride the foot both act to prevent swinging movement of the brace 23 out of the plane of the side of the trap 1.

When the bolts 27 are loosened sufficiently, the arms of each brace 23 can be swung as a unit outwardly and upwardly around the respective side of the top frame 3 to a position generally inwardly of and coplanar with the frame 3. The tubes 24 are prevented from sliding rearwardly along the sides of the frame 3 by means of a side-to-side crossbar or frame support 28 welded to the main bar of the upper frame 3. Forward movement of these tubes on the frame 3 is prevented by small lugs 29 welded to the frame 3 just ahead of the tubes 24.

As seen in FIG. 3, the lines extending downwardly and outwardly from the tube 24 are merely diagrammatic indications of an intermediate position of the arms of the inverted V-shaped brace 23, which orientation might be assumed in the swinging movement of the brace 23 outwardly and upwardly and around the upper frame 3.

The front and rear sides of the top frame 3 are connected by a front-to-rear support bar 30, the ends of which are welded to the main bar of the frame 3. Just to the right of the rearward end of the bar 30 is a vertical rear frame support member 32 extending between the top frame 3 and the lower frame 2. The ends of bar 32 are welded to an upper tube 33 rotatably mounted on a rear central portion of frame 3 and to the inner forwardly facing side of a lower tube 34 rotatably mounted on a central rear portion of lower frame 2. The lower tube 34 is kept from sliding to the right along the frame 2 by means of a stop lug 35 welded to the frame 2 at the right end of the tube 34. The upper tube is prevented from moving to the left as seen in FIG. 1 by the rear end of the bar 30. The tube 33 is kept from moving to the right along the frame 3 by means of a stop and latching structure described hereinafter and illustrated in FIGS. 14, 14A and 14B.

Figure 10:
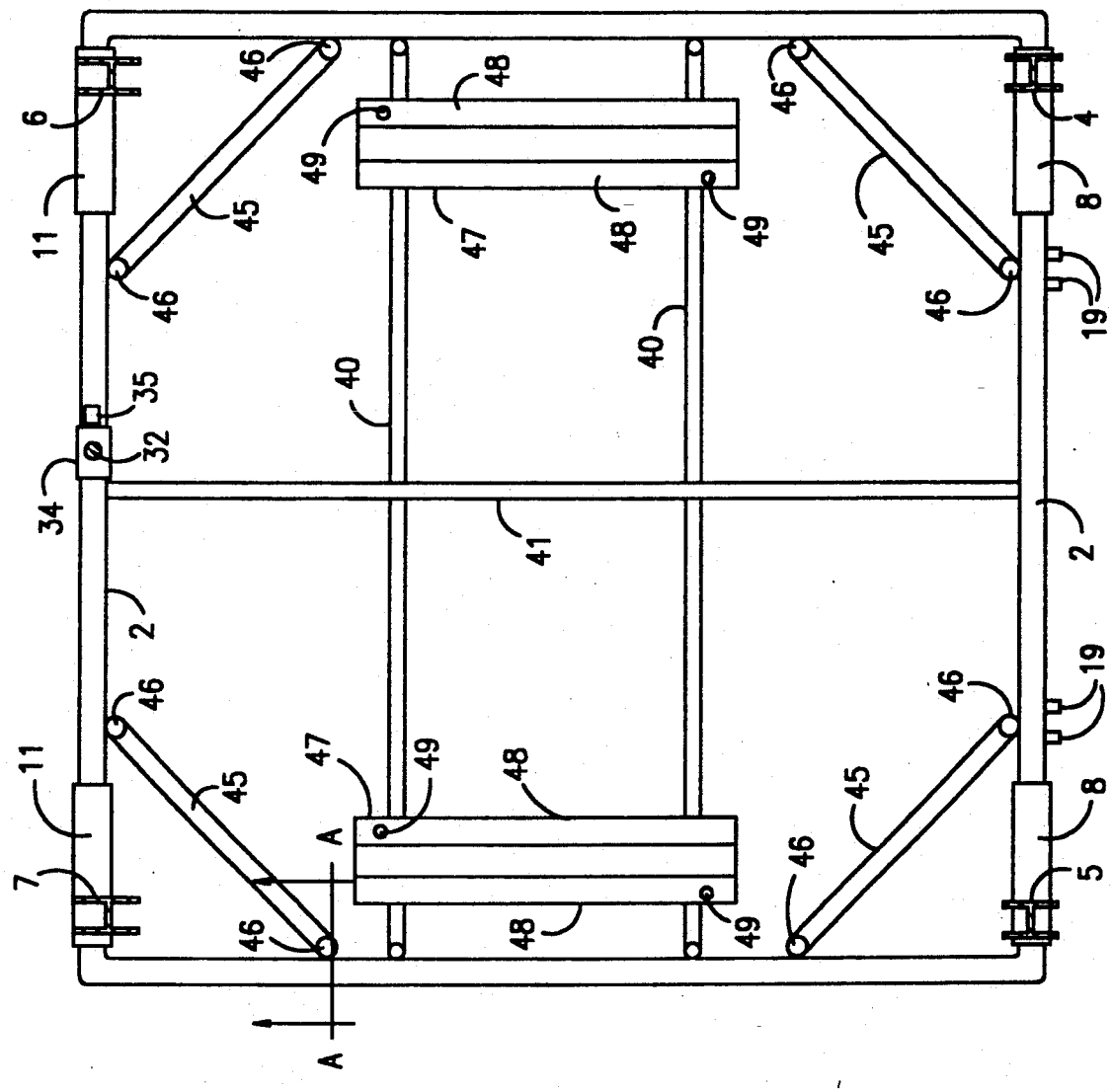
FIG. 10 is a horizontal section looking downwardly from just above the lower frame portion of the trap showing more clearly diagonal corner bracing members attached to a lower rectangular frame structure and also showing attachment of rail sections to transversely extending bars of the frame as additional weight for the trap.
Figure 10A:
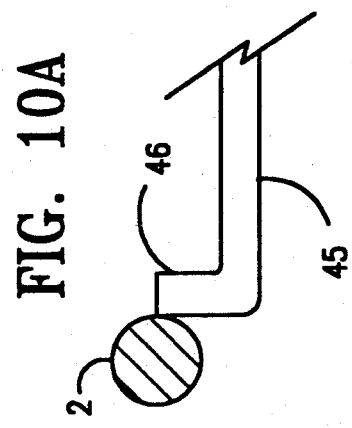
FIG. 10A is an enlarged section on line A—A of FIG. 10, illustrating the attachment of lower corner braces to the rectangular frame bar of FIG. 10.

As seen in FIGS. 1 and 10 the lower frame 2 is provided with two side-to-side cross bar members 40, the ends of which are welded to the side portions of the frame 2. A front-to-rear support member 41 extends from a front central portion of the frame 2 to a rear central portion of the frame 2 just to the left of the lower tube 34 which keeps the latter from moving to the left on the frame 2. Lower corner braces 45 shown most clearly in FIG. 10 extend at 45 degree angles across the four corners of the lower frame 2. Each of these corner braces 45 has upturned ends 46 which are welded to the inside of the base frame 2 as seen in FIG. 10A. The straight horizontal lower portions of the corner braces 45 extend a sufficient distance below the bottom of the frame 2 so that these frame members not only provide support for the trap and wear protection for the hinges when it is resting on a flat surface, but they also provide a nesting capability whereby these depending corner brace portions can fit and nest within the corners of a top frame 23 of another trap structure and keep the frame 2 from sliding off an underlying top frame of another like trap structure on which the trap is stacked.

Multiple traps can be stacked in nested relationship, either in their erect or completely collapsed configurations. Because of the depending configuration of the corner braces 45, multiple collapsed traps can be stacked in a stepped stack arrangement with each successive trap having its braces 45 fitting within the top frame 3 of the next lower trap structure. Similarly erect traps can also be stacked, if desired, by such nesting of the cross braces 45 in the next lower trap.

A collapsed pot will be about 3.5 inches high and about 116.5 inches long. The pots can be overlapped in stacking and successive layers will be transversely offset alternately about ¼ inch to eliminate edge-to-edge contact of the I-beam flanges when necessary.

A deck area of 28 feet by 54 feet will hold 28 collapsed pots and 350 pots can be stacked in such an area in a stack less than 4 feet high. For pots weighing 650 pounds this would be a load of 113.75 tons.

The triangular areas, bounded by the posts 4 and 5, the tubes 9 and the corner braces 12, in the upper front corners of the door-opening side of the trap structure 1 may be conveniently permanently covered by steel, wire or other mesh net parts 50 welded or otherwise secured to the members at the sides of these triangular areas as shown in FIG. 5.

As seen in FIG. 10, additional weight can be added to the structure of trap 1 by means of railway rail sections 47 extending transversely over the cross bar members 40 and generally parallel to the sides of the lower frame 2. These rails 47 have their base flanged portions 48 resting on members 40 and have diagonally opposite holes in the flange portions through which extend J-bolts 49 having curved portions (not-shown) hooked around the lower sides of the respective cross bars 40 to secure the extra ballast weight means comprising the rail weights 47 thereto. The rail weights 47 are removably attached to the cross bar members 40 by means including the J-bolts 49 after a netting structure is positioned within the trap structure 1 and the weights 47 are positioned on the bottom of the net structure a sufficient distance from the sides of the trap structure so as not to interfere with tunnel floor and entrances of the netting structure which are described hereinafter and shown in FIGS. 6 and 8. The rail weights 47 within the trap structure interfere with folding the trap to its totally collapsed configuration. Removal of the weights, required to enable folding the trap structure to its totally collapsed configuration, is enabled by detaching the J-bolts 49 from the cross bars 40.

The detachable rails 47 can be conveniently moved to the hold of a vessel during bad weather and heavy seas to create a great shift of the center of gravity of the vessel and improve its stability under such conditions.

The top of the members 40 are coplanar with the bottom of frame 2.

Figure 10B:
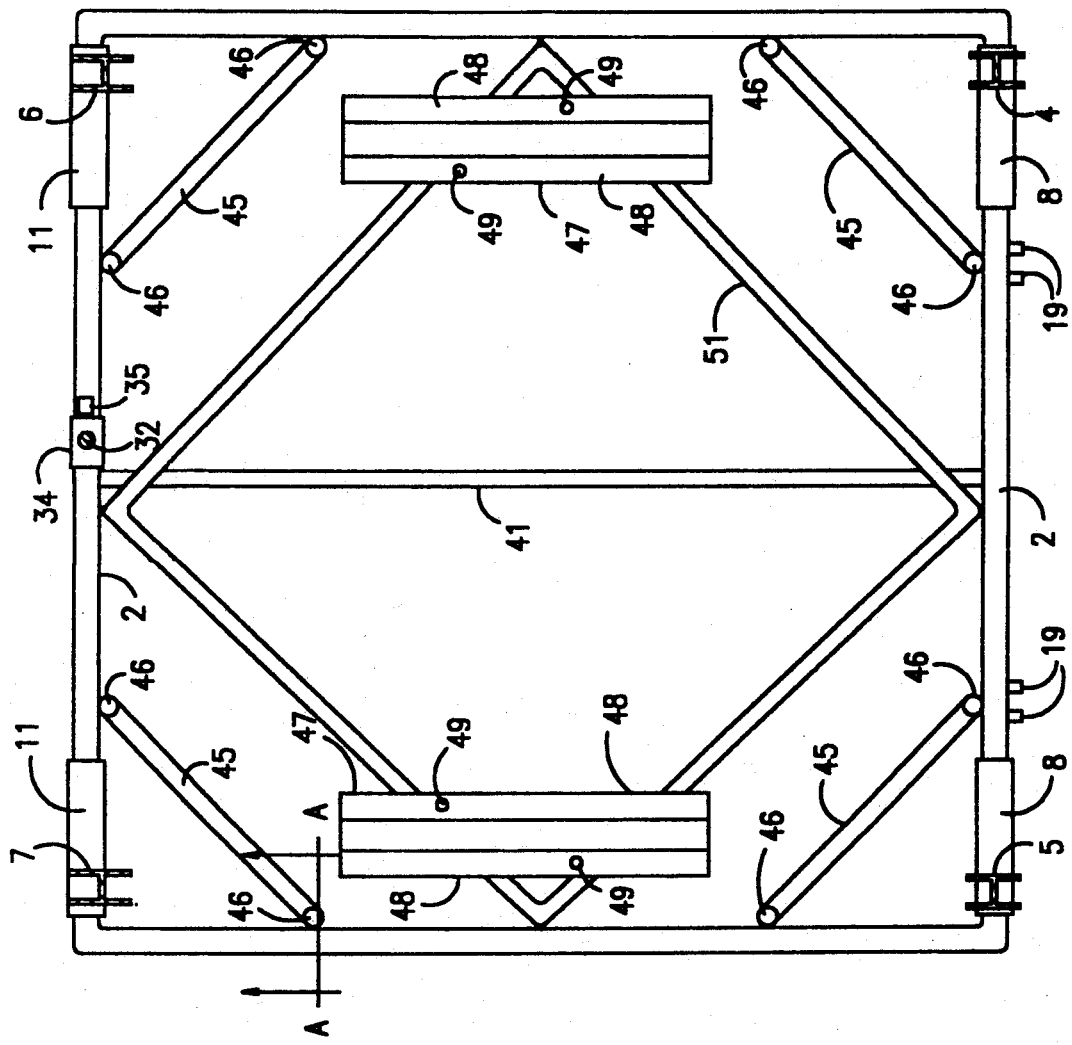
FIG. 10B is a view similar to FIG. 10, but showing the preferred embodiment for the arrangement of cross supports inside the lower or base frame portion of the trap including a diamond shaped member to which removable weights are secured.

An alternative structure and preferred embodiment for the supporting bars for the bottom frame 2 may include one or more crossed bars, like the bars 28 and 30 shown in the top frame 3, and diagonal bars connecting their outer ends to form a diamond 51 and extending generally parallel to the corner braces 45 shown in FIG. 10B. Such an arrangement has the advantage of eliminating any cross bars in the bottom frame 2 at points where the flanges of the I-beam corner posts fold down to the position of FIG. 4 where the front corner posts are essentially coplanar with the lower frame 2. Such a configuration also provides a greater choice of positions on the top of various cross bars of the lower frame 2 to arrange each of the rail weights 47 in a crossing relationship to two cross bars for attachment thereto in the same manner described in connection with FIG. 10.

In lieu of the rails 47 an alternative extra weight structure may be made using a tubular plastic or rubber hose container about 8 inches in diameter and five feet long which is filled with a suitable gravel or other aggregate and the ends closed by secured caps, by squeezing and bolting or by any other means. Releasable straps may be used to secure these weight structures to the cross bars of the bottom frame 2. When transported without the aggregate in the containers, the weight saving is about 75 to 125 pounds per container.

A unitary bag-like net fabric crab pot liner structure 55 is shown in FIGS. 6, 8 and 9, and comprises a top rectangular area portion 56 generally coextensive with the inner perimeter of frame 3, a rear rectangular portion 57 generally coextensive with the inner perimeter of the rear side of the trap between the frames 2 and 3 and the corner posts 6 and 7, and a bottom rectangular area portion 58 generally coextensive with the inner perimeter of the base frame 2. The net structure 55 also includes right and left end tunnel area structures 59 and 60. The entrance openings of these tunnel structures are secured to the top rear and bottom portions 56, 57 and 58 of the netting structure. The front vertical edges of the tunnel openings are secured to the front corner posts 4 and 5. Thus, the unitary fabric bag-like crab pot liner has interconnected netting areas which close each of the top, bottom, rear (lifting side), and tunnel side frame portions of the crab pot frame structure when it is inserted into and secured in the frame structure, leaving only the door frame in the door side frame of the pot structure to be separately covered. Of the five liner areas of netting fabric, the peripheral portions of the top and bottom areas of the liner are secured in registry with the parallel top and bottom rectangular horizontally extending frames of the crab pot structure and the three vertically extending additional liner areas, including at least one area forming a tunnel having convergent wall portions by stretching the central portions around its exit opening toward the center of the liner, have their rectangularly configured peripheral portions secured in registry with three vertically extending side frames of the crab pot structure.

The tunnel netting area structures 59 and 60 are convergent from their generally rectangular entrance openings to a restricted exit opening into the interior of the trap structure 1. These exit openings are near the center of the trap and are defined by a rectangular hoop 63 for the right tunnel, the hoop open generally upwardly near the center of the trap. A similar hoop 64 is provided for the left tunnel. The small elongated rigid tunnel exit opening frames formed by these hoops 63 and 64 are tied or otherwise secured to the central openings of the tunnel netting structure areas and lines 65 are connected to opposite ends of the innermost elongated side bars of the hoops 63 and 64 to pull the exit openings formed thereby towards each other at the center of the trap.

The present invention contemplates several ways to form the top rear and bottom and tunnel portions of a unitary netting structure as a single unit which can be marketed by itself for replacement of net structures in presently manufactured traps or which can be secured in the frame structure of FIG. 1.

As seen in FIG. 6A, a separate piece of netting 70 is placed over the inside of the door and has its edges folded around the periphery of the door. The door netting has a plurality of peripherally spaced loops or openings in the netting web through which is threaded a line or rope to draw these loops toward the center of the door to stress the netting taught across the inside of the door. The ends of the line are tied or otherwise secured to each other to maintain tension on the door netting. The netting 70, the loops and the line 73 may be tied together at appropriate points if desired during installation of the door netting to prevent shifting of the netting relative to the door frame.

Various tube structures have been described as being rotatably mounted on the lower frame 2 or upper frame 3. Wherever such tubes are so rotatably mounted they are preferably separated from the respective bars 2 or 3 by means of cylindrical sleeves therebetween of polyethylene or other anti-friction and wear resistant material. In addition to the inverted V-shaped braces 23 described above/ the invention also contemplates the use of shear-resistant pin or shear-resistant bolt structures for preventing relative rotation of tube hinge members with respect to the bars 2 and 3. As seen in FIG. 7A, the bar 2 is provided with an outer tube 81 welded thereto for reinforcement to a portion of the bar 2 through which a shear-resistant pin or bolt 83 extends. In the erect position of the trap the shear-resistant pin apertures in the bar 2 and the sleeve 82 and through the outer hinge tube 10 are all aligned for insertion of the shear-resistant pin 83.

When using the braces 23, or braces 130-133 described hereinafter, the shear-resistant pins or bolts may be omitted and the structure at each hinge tube may comprise only the anti-friction sleeve between the tube and the respective bar 2 or 3 as shown in the similar section in FIG. 7B.

When the inverted V-shaped braces 23 are disconnected from the respective corner posts, and swung to lie atop the top frame 3, and with any shear-resistant pins removed, the top frame 3 may be moved in a translatory motion relative to the bottom frame 2 from the position of FIG. 2, through the intermediate position of FIG. 3, to the completely collapsed position of the trap as in FIG. 4 wherein the frame 3 rests adjacent to and atop the frame 2.

In the preferred embodiment this translatory motion is permitted only by manually unlatching a latching lever 85 seen in FIGS. 14, 14A and 14B. This latching lever 85 is secured to the upper tube member 33 on the rear vertical support 32 at the right end 85 a of the lever as seen in FIG. 14. The left free end 85b of the latch 85 extends beyond the left end of tube 33. As seen in FIGS. 14A and 14B, the main bar 3 has a stop lug 86 thereon and welded thereto which has an abutment surface engaged by an edge surface 87 of an arcuate extension of the tube 33 to limit counterclockwise movement of the tube 33 relative to the bar 3. The limiting position when these surfaces engage corresponds to, the erect position of the trap frame structure 1 as in FIGS. 1 and 2. When the upper frame member 2 is moved from the position shown in FIG. 4 to the erect position of FIG. 2, not only are the parts 86 and 87 in engagement, but also the free end of the latching lever 85 passes upwardly on and over a raised camming portion 88 atop the stop lug 86 until, in the erect trap position the latching lever drops from atop the portion 88a to engagement behind an abutment surface 88b of the part 88. In dropping behind the surface 88b, the latching lever 85 automatically latches the tube 33 against clockwise movement relative to the bar 3 as seen in FIG. 14A. This at least temporarily holds the upper frame 3 from falling from its erect position while other securing means such as braces 23 are put in place to rigidize the trap frame structure.

For lowering the top frame 3 to its collapsed position after all braces and shear-resistant pins are removed, the end 85b of the latching lever may be lifted to disengage the lever from the abutment 88b and allow clockwise movement of the tube 33 relative to the main bar 3 and collapse of the trap structure to the position of FIG. 4. In this position the latch structure parts will be in the respective positions shown in FIG. 14B.

To collapse a crab pot having the added weight 47 to a configuration corresponding to that of FIG. 4, it is necessary to first open the crab pot door and swing the latter to a position atop the top frame 3. The weight are then unbolted and removed. The door is then returned to its closed position, but is not latched. Any shear-resistant pin retaining members at the hinge structure are removed and the braces 23 are unfastened at the lower ends of their arms from the corner posts 4-7 and swung atop the upper frame 3. Thereupon, manual release of the spring latch 85 will allow the upper frame 3 to be swung with a translatory motion, i. e. in an arcuate path but only in the direction toward the rear and remaining with its sides parallel to and above the sides of the lower frame 2. In the fully collapsed position there is little interference from the netting 55 which can remain within the frame structure and the top frame 3 will move to rest atop the lower frame 2.

In FIG. 11 there is a structure of rope-like members comprising rope rings and vertical connecting ropes intended for use within the structure of the trap netting 55 to anchor the latter to all the peripheral sides of the trap. A top rope ring 100 having interengaged end loops 101 represents a ring that will be secured around the inner periphery of the top bar 3. The interengaged end loops represent any suitable fastening or tying of the rope ring ends to suitably tension the ring in a manner to be described hereinafter. Similarly the bottom rope ring 103 is intended to be mounted within the inner periphery of the lower frame 2 and also has similar fastening means 104. Interconnecting the respective corners of the rings 100 and 103 are vertical ropes 106, two of which are shown by way of example. These vertical ropes are tied to the corners of the rings 100 and 103 and will be located at the inside surfaces of the corner posts 4-7. Alternatively the vertical ropes 106 may be tied or otherwise secured to the top and bottom of the respective corner posts as by passing through holes drilled thereinto extend along the inwardly facing web ports thereof.

The corners of the rope loops 100 and 103 may be secured to the trap by passing them through holes in the lower and upper ends of the corner posts as shown in FIGS. 1B and 1C.

As an alternative to passing the rope loops 100 and 103 through the holes 120 and 122 in the posts at the corners of the trap, hooks like the hooks 110 in FIG. 12 may be welded to the insides of the web portions of the I-beams posts at the ends thereof just inside the upper and lower bars 3 and 2 for attachment of the corners of the loops 100 and 103. Additional such hooks 110 can be provided along the post webs for securing the corner ropes 106. By using such hooks the rope structures of FIG. 11 may be secured to the netting 55 and the latter secured to the trap frame structure merely by slipping the ropes transversely into the hooks through openings between the split ends of these hooks. The split openings may be pried apart, if necessary, and then squeezed together after insertion of the ropes to assure optimum retention of the ropes in the hooks 110. In addition, in presently manufactured pots these hooks may be slipped over the existing tie bars prior to passing the rope through the hooks to secure the netting to the pot.

The rope portions 103 shown in FIGS. 12 and 13 are representative of the rope 103 of FIG. 11. In these two FIGS. 12 and 13 the netting 55 is shown passing at a right angle fold which can occur, for example, where the netting is folded between the bottom and the rear walls or sides of the trap. The rope-attaching hooks 110 of FIG. 12, or the plastic covered cable members 115 with looped ends through which the netting supporting rope is passed as shown in FIG. 13 for securing the netting to the frame, are oriented slightly upwardly as they would be for attaching netting ropes to the lower frame 2. The orientation of these rope-attaching means will change according to the preferred orientation of the netting with respect to the respective frame or post structure. For example, such rope-attaching means would be similarly inclined slightly downwardly relative to the top frame 3 for fastening the netting thereto.

FIGS. 15, 16 and 17 illustrate patterns which can be used to make a netting structure 55 from a sheet of netting fabric. Of these patterns, FIG. 16 is the preferred embodiment. In the patterns of FIGS. 15-17, numbers 56 through 60 have been used to identify netting portions previously described for the netting 55. Suffixes "t" and "b" applied to any of the numbers in these figures refer to the parts of the patterns which form the "top" and "bottom" respectively of the tunnels structures 59 or 60 or the rear wall 57 of the netting 55. The letters "A" and "B" correspond to corners of the netting to be located at the upper front right and left corners of the trap structure 1 as seen in FIG. 1. The letters "C" and "D" correspond to corners of the netting to be located at the upper rear left and right corners of the trap structure 1 as seen in FIG. 1. The letters "E", "F", "G" and "H" correspond to lower corners of the netting to be positioned at the lower corners of the trap structure below the corners "A", "B", "C" and "D", respectively. Plain or primed lower case letters are shown in pairs in the various FIGS. 15-17 to identify corresponding edge portions of the netting fabric which are to be stitched, tied nor otherwise secured together to form the respective bag-like netting structures. In FIG. 17, the c—c and c'—c' junctions are between a netting portion and a side of hoop 64 or hoop 63 respectively.

In FIG. 16 the portions of the netting which will form the tunnel portions along lines A-E, B-F, C-G and D-H are shown to be about twice as long as the corresponding lengths of the netting material along paths C-J-K-G and D-I-L-H after the sides m—m are secured together. This provides an excess of netting material to be gathered along the edges C-G, D-N and P-H before being secured to the respective edge portions C-J-K-G, D-I and L-H. The portion along C-G is equally divided before gathering between edges C-J and K-G. The density of gathering (amount of material per unit length along the gathered seam) increases progressively from D to N, from H to P and between C and G it increases correspondingly toward the center point between these points C and G. Similarly and respectively, the edges from A to M, from E to O and from B to F are gathered with increasing density before being secured along the front corner posts 4 and 5 of the trap frame structure. This gathering at the vertical sides along the door-opening side of the trap may be achieved even before placing the netting in the trap by appropriately securing the gathered edges to predetermined points along the vertical ropes 106 shown in FIG. 11. This gathering facilitates elongation of the netting along sides of the tunnels when tension forces are applied between hoops 63 and 64 to pull the latter toward each other.

A bracing structure alternative to the inverted-V structure 23 in the previously described embodiment is shown in FIG. 18 which is a side view of the frame of the trap in its erect position. The frame is held in the erect position by angularly oriented braces 130 and 131 extending downwardly and outwardly between the top main bar 3 and midpoints of the vertical corner posts 4 and 6, respectively. Similar angularly oriented braces 132 and 133 extend from the lower main bar 2 upwardly and outwardly to the same midpoints of the respective posts 4 and 6. Each of the braces 130-133 has at its end connected to one of the main bars 2 or 3 an end tube 134 which is rotatable on the respective main bar and is slidable therealong. The opposite ends of these braces 130-133 each have a flat foot member 135 arranged in a plane generally parallel to the web of the respective corner post to which it is to be attached. For example, the detail of FIG. 18 A illustrates the two feet 135 for the braces 130 and 132 clamped to the web portion 4a of the vertical post 4. Both of these feet are clamped essentially at the midpoint of the vertical corner post 4. Each of the feet 135 has a hole in a toe portion thereof which is arranged to slide over the end of a threaded stud 136 before placing a nut thereon and each of the feet 135 has another hole therein, towards its heel and near the attachment point of the respective brace, which fits over the end of a respective unthreaded stud 137. The studs 136 and 137 are permanently secured to the web member 4a and project therethrough so that each foot 135 can slide over the stud 136 and one of the studs 137 after being aligned therewith by rotation of the respective tube 134 at the other end of the respective brace. After such alignment the tube 134 can be slid toward the corner post so that the foot member 135 is positioned as seen in FIG. 18A. The feet 135 on the top braces 130-131 are placed over their respective studs 136-137 before the feet 135 of the lower braces 132-133 are similarly positioned over their respective studs. In FIG. 18A, there is a small spacer 138 secured to the web 4a and positioned underneath the heel of the foot 135 attached to the brace 132 for supporting the latter at the same distance from the web that the toe portion thereof is supported when superimposed upon the foot 135 of the upper brace 130. The depending cross members 45 of the previous embodiment are not shown in FIG. 18, but they may be used along with other features of the previous embodiment which do not affect the operation of the braces 130-134 as described. Except for the substitution of the braces 130-133 and their attaching means for the inverted V-shaped braces 23 and their attaching means, the trap frame structure of the embodiment of FIG. 18 would otherwise be the same as the previously described embodiment. The stop members and latching structures at the vertical rear frame support member 32 would perform the same functions described in connection with FIGS. 14, 14A and 14B. When the trap is to be collapsed, all feet 135 are unbolted and separated from the studs 136-137 on the respective cornerposts and these braces are moved toward the center of the respective side of the trap. The top braces 130 and 131 are swung outwardly up and over the bar 3 to rest atop the netting within the perimeter of the frame 3. Similarly the braces 132-133 are slid centrally so that upon collapsing of the trap they can be swung inwardly to lie atop the netting at the lower portion of the entrance tunnel at that side of the trap and rest on the netting when the trap is collapsed after releasing the latching lever 85 and allowing the frame 3 to move in a translatory motion from its erect position downwardly and rearwardly to a position atop the lower frame 2. The brace 131 is shown in dotted lines at the upper right of FIG. 18 to indicate an intermediate position after rotation of approximately 180 degrees around the bar 3 and before further downward rotation to rest on the top portion of the netting within frame 3.

The dimensions and materials of the components of the trap frame structures described above may be as follows for King Crab pots. The top and bottom main frame bars 2 and 3 are steel bars of 1.25 to 1.50 inch. diameter. The rear center vertical bar 32 is a steel bar of 1.0 inch diameter. The cross bars 28, 30, 40 and 41, the bars of the inverted V-shaped braces 23, and the door bars 14 and 17 are steel bars of 0.625 to 0.75 inch diameter. The corner braces 12,13 and 45 are steel bars of ⅝ inch diameter. The I-beam corner posts are 3 inch I-beams. The bolts 27, shear-resistant pins or bolts 83, studs 136, bolts 137 and nuts therefor are corrosion resistant 316 stainless steel of ½ inch diameter.

Throughout the above descriptions, numerous tube hinge members are rotatably mounted on portions of the top frame loop 3 or portions of the bottom frame loop 2. In all cases these hinge tubes must be provided with adjacent lugs on the loops 2 and 3 like the lugs 29, 35 or 86, or adjacent bars like the bars 28 and 30, to preclude any axial movement of these hinge tubes relative to the loops 2 and 3.

For Dungeness crabs the pots may be made smaller, but the same system for collapsing the pots and the unitary netting concept described above may be used. However, since the stresses on the pot structures would be less, the use of shear-resistant pins or bolts may be used to secure the hinges to the exclusion of braces 23 or 130-133.

The present invention produces combined benefits for fishermen based on collapsing of crab pots and having removable weights on the crab pots. Making a crab pot collapsible has a very significant effect in increasing the number of pots that can, when collapsed, be safely transported on the deck of a vessel, in comparison to the number that can be safely transported on the deck when the traps are stacked in their erect configuration. This change is directly related to the substantially lower center of gravity for the stack of collapsed pots. For the height reduction achieved with the collapsing capability of the present invention, the increase in number of pots that can be carried is of the order of 30 to 50 percent, depending on the characteristics of the particular vessel.

Removing the auxiliary or extra weights from the pots on the deck has a similar effect of improving the vessel's stability or of increasing the number of pots that can be safely transported. When the removed weights are transferred to a storage location in low areas of the vessel's hull, the overall center of gravity of the vessel and its load is lowered and the vessel's stability is increased. Even though the vessel may travel with such a storage hold filled with sea water, part of the water can be displaced by the steel rail weights, with a resultant lowering of the effective center of gravity of the vessel.

A practical minimum amount of weight to be removed from a pot and stored in a vessel's hold is believed to be about 100 pounds in order to produce a significant shift in the vessel's center of gravity when carrying a large number of pots. For a weighted pot having a total weight of 700 pounds, removable weight totaling 100 pounds would be about 14 percent weight reduction. Of course any percentage higher than this produces increased benefits as far as the shift of center of gravity is concerned. However, the practical upper limit is determined primarily by the requirement for structural integrity of the unweighted pot. Any weight reduction must be achieved without sacrificing the structural integrity of the pot during use.

Other variations within the scope of this invention will be apparent from the described embodiments and it is intended that the present descriptions be illustrative of the inventive features encompassed by the appended claims.

What is claimed is:

1. A collapsible crab pot frame structure having an erect configuration and a collapsed configuration, the frame structure having in its erect configuration generally square, parallel vertically-spaced top and bottom horizontally extending frames with the four respective corners of the top and bottom frames being interconnected by four post structures to form four horizontally elongated generally rectangular vertically-extending side frames of the crab pot frame structure, said four side frames comprising tunnel side frames, a door side frame interconnecting said tunnel side frames at one end of each of the tunnel side frames and a lifting side frame, parallel to said door side frame and interconnecting said tunnel side frames at the other end of each of the tunnel side frames, hinge means pivotably connecting the opposite ends of each post structure to corner portions of the top and bottom frames, respectively, to provide translatory swinging movement of the top frame from its erect position downwardly and away from the erect position of said door side frame to a collapsed position adjacent and parallel to the bottom frame, the shape of said tunnel side frames changing from rectangular parallelograms to flattened parallelograms during such translatory movement, a door frame in said door side frame, hinge means pivotable connecting said door frame to said top frame at the top of said door side frame and enabling, in the erect configuration of the frame structure, swinging movement of the door frame between a closed position in said door side frame to an open position atop the top frame, and means for securing said door frame in its closed position when the frame structure is in its erect configuration.

2. A collapsible crab pot frame structure according to claim 1 wherein, in the collapsed configuration of the crab pot frame structure, said door frame lies within said bottom frame and essentially parallel thereto.

3. A collapsible crab pot frame structure according to claim 2 wherein, in said collapsed configuration, top surfaces of members forming said door frame and top surfaces of members forming said bottom frame are essentially coplanar.

4. A collapsible crab pot frame structure according to claim 1 wherein said frame structure has attaching means for securing rope-like members to the frame structure at spaced points along at least the periphery of each top and bottom frame for attaching a net structure to the frame structure.

5. A collapsible crab pot frame structure according to claim 4 wherein said rope securing means comprises a plurality of spaced hooks capable of penetrating net fabric of a crab pot liner from one side thereof to securely engage liner-attaching rope-like members on the opposite side of the net fabric.

6. A collapsible crab pot frame structure according to claim 1 wherein said bottom frame has means for attaching removable elongated weight means thereto with the weight extending across, and being secured to, said bottom frame, said weight attaching means enabling removal of said weight means to enable collapsing of the frame structure to a completely collapsed configuration.

7. A collapsible crab pot frame structure according to claim 1 wherein said bottom frame has spaced bar members extending across central areas thereof, removable elongated weight means extending across the top of and being secured to said bar members, said weight means interfering with total collapse of said frame structure and including means whereby the weight means can be removed to enable collapsing of the frame structure to a totally collapsed configuration.

8. A collapsible crab pot frame structure according to claim 7 wherein each said weight means includes a container means for containing aggregate.

9. A collapsible crab pot frame structure according to claim 7 wherein each said weight means comprises a length of railway rail.

10. A collapsible crab pot frame structure according to claim 1 wherein each said post structure comprises an I-beam member having its central web portion extending parallel to said lifting side frame and said door-opening side frame.

11. A collapsible crab pot frame structure according to claim 1 wherein said tunnel side frames each include diagonally extending releasable bracing means secured between at least one of the top and bottom frames and the post structures at opposite ends of the respective tunnel side frame to maintain the tunnel side frame in a rigid rectangular shape while said crab pot is in use.

12. A collapsible crab pot frame structure according to claim 11 wherein each releasable bracing means comprises an inverted V-shaped structure having two arms with one end of each arm being connected at the vertex of the V-shaped structure, said V-shaped structure having means pivotably connecting said V-shaped structure at said vertex to said top frame, and including releasable fastening means securing the other end of each arm of the V-shaped structure to a respective post structure.

13. A collapsible crab pot frame structure according to claim 11, further including a separate manually releasable latch means automatically engageable upon movement of the top frame to its erect position to retain the top frame in its erect position while said bracing means is being secured to maintain the frame structure erect, said latch means being releasable to enable movement of the top frame to its collapsed position.

14. A collapsible crab pot frame structure according to claim 1 including at least one central vertical bracing bar extending across a central area of said lifting side frame, each such bracing bar having hinge means at one end for pivotably connecting it to the top frame and hinge means at its other end for pivotably connecting it to the bottom frame.

15. A collapsible crab pot frame structure according to claim 14 wherein one such vertical bracing bar has at one end thereof a manually releasable latch means interconnecting it with one of said top and bottom frames to retain said frame structure in its erect position.

16. A collapsible crab pot frame structure according to claim 1 wherein each of said hinge means comprises a tubular member having a horizontal axis and within which is received a rotatable portion of one of the top and bottom frames.

17. A collapsible crab pot frame structure according to claim 16 wherein each said tubular member is an elongated tube extending perpendicular to a respective post structure and including bracing means between the tube and the respective post structure to reinforce the hinge means to prevent movement of the top frame transversely of its direction of collapsing movement.

18. A crab pot bag-like liner of net fabric for a crab pot openwork frame structure, said liner comprising five areas with each area having respective peripheral portions arranged in a rectangular configuration, said areas including horizontally extending essentially parallel top and bottom rectangular areas and three additional vertically extending areas, said three vertically extending additional netting areas comprising at least one tunnel netting area with peripheral portions forming a rectangular large tunnel entrance opening, each tunnel netting area extending between its peripheral portion and central portions defining an elongated central tunnel exit opening, each such said tunnel netting area having said central portions stretched toward the center of the liner forming a tunnel shape having a configuration with wall portions configured to converge toward the center of the liner by tension means to draw said central portions at each said exit opening toward the center of the liner, said liner being configured for mounting in a frame structure having generally rectangular parallel top and bottom horizontally extending frames with the four respective corners of the top and bottom frames being interconnected by four post structures to form four horizontally elongated generally rectangular vertically-extending side frames of the crab pot frame structure including a door side frame and three additional side frames, at least one of said additional side frames being a tunnel side frame, said netting areas being interconnected to form a unitary liner insertable within the crab pot frame structure and having a plurality of attachment points for securing it to the frame structure at the insides of the top and bottom frames and at said four post structures with the peripheral portions of said additional liner areas secured to said additional side frames of the crab pot structure.

19. A crab pot liner of net fabric according to claim 18 wherein said unitary liner has secured to the netting areas thereof relatively heavy strong horizontally extending rope-like members which can be attached closely to and along said top and bottom frame members to hold said top and bottom netting areas taut.

20. A crab pot liner of net fabric according to claim 19 further including additional rope-like members secured to vertically extending peripheral portions of said additional netting areas thereof for attachment closely to and along each said post structure.

21. A crab pot liner of net fabric according to claim 18 wherein all of the netting areas are interconnected portions of a single sheet of net fabric which has a formed shape according to a pattern and is folded and stitched along certain lines of said pattern to provide its unitary bag-like configuration.

22. A crab pot liner of net fabric according to claim 18 wherein said net fabric comprises crossed strands defining parallelogram-shaped openings therein, and wherein the fabric is oriented at each of said areas to be on the bias to permit tensioning thereof across the respective areas and stretching thereof to form each said tunnel shape.

23. A collapsible crab pot structure comprising:
a crab pot frame structure having an erect configuration and a collapsed configuration, the frame structure having in its erect configuration generally square parallel vertically-spaced top and bottom horizontally extending frames with the four respective corners of the top and bottom frames being interconnected by four post structures to form four horizontally elongated generally rectangular vertically-extending side frames of the crab pot frame structure and comprising tunnel side frames, a door side frame interconnecting said tunnel side frames at one end of each of the tunnel side frames and a lifting side frame, parallel to said door side frame, interconnecting said tunnel side frames at the other end of each of the tunnel side frames,
a crab pot bag-like liner of net fabric within said crab pot frame structure, said liner having top and bottom netting areas for attachment to said structure to close the square top and bottom frames of said structure,
said liner having a rectangular side netting area for closing said lifting side frame,
said liner having two tunnel netting areas with peripheral portions to be attached, respectively, to the tunnel side frames to form rectangular large tunnel entrance openings, each tunnel netting area extending between its peripheral portion and an elongated central opening at the periphery of which is secured a small elongated rigid pot entrance frame,
said netting areas being interconnected to form a unitary liner insertable within the crab pot frame structure and having a plurality of attachment points for securing it to the frame structure at the insides of the top and bottom frames and said four post structures,
tension means attached to said liner at said central openings for stretching said tunnel areas and pulling said pot entrance frames toward an upper central internal area of the crab pot frame structure to form convergent tunnel netting structures terminating at said pot entrance frames.

24. A collapsible crab pot frame structure having an erect configuration and a collapsed configuration, the frame structure having in its erect configuration generally rectangular parallel vertically-spaced top and bottom horizontally extending loops, each loop being formed by at least one bar member with horizontally extending ends, said ends being connected to define the loop, with the four respective corners of the top and bottom loops being interconnected by four post structures to form four horizontally elongated generally rectangular vertically-extending side frames of the crab pot frame structure, a tubular hinge means at each end of each post structure rotatably supported on a bar member portion which forms a bearing surface therefor, each said hinge means pivotably connecting one end of a respective post structure to a corner portion of one of said top and bottom loops, respectively, to provide translatory swinging movement of the top loop from its erect position to a collapsed position adjacent and parallel to the bottom loop.

25. A collapsible crab pot frame structure according to claim 24 wherein each of said hinge means comprises an elongated tubular member having a horizontal axis and within which is received a portion of one of the top and bottom loops on which portion the tubular member is relatively rotatable, said frame structure having releasable pin means interconnecting one or more of said tubular members with one of the loops to prevent collapsing movement of the frame structure from its erect configuration to the collapsed configuration.

26. A collapsible crab pot frame structure according to claim 24 wherein each said tubular hinge means includes an elongated tube extending perpendicular to a respective post structure and including bracing means between the tube and the respective post structure to reinforce the hinge means to prevent movement of the top loop transversely of its direction of collapsing movement.

27. A collapsible crab pot frame structure according to claim 24 wherein two of said side frames are each parallel to the direction of translatory collapsing movement of the top loop, each of said two side frames including diagonally extending releasable bracing means secured between at least one of the top and bottom loops and the post structures at opposite ends of the respective side frame to maintain the respective side frame in a rigid rectangular shape while said crab pot is in use.

28. A collapsible crab pot frame structure according to claim 24 wherein said frame structure includes removable weight means attached to said frame structure, said weight means weighing at least 100 pounds.

29. A collapsible crab pot frame structure according to claim 24 wherein said frame structure has a removable weight means attached to said frame structure, said weight means weighing at least 15 percent of the weight of the crab pot frame structure.

* * * * *